US009202268B2

(12) United States Patent
Kelly

(10) Patent No.: US 9,202,268 B2
(45) Date of Patent: Dec. 1, 2015

(54) METHOD FOR FRAME AVERAGING POST-FILTER OPTIMIZATION

(71) Applicant: Matthew David Kelly, Botley (GB)

(72) Inventor: Matthew David Kelly, Botley (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/185,192

(22) Filed: Feb. 20, 2014

(65) Prior Publication Data
US 2014/0233821 A1 Aug. 21, 2014

(30) Foreign Application Priority Data

Feb. 20, 2013 (GB) .................................. 1302982.2

(51) Int. Cl.
*G06K 9/00* (2006.01)
*G06T 5/50* (2006.01)
*G06T 5/00* (2006.01)

(52) U.S. Cl.
CPC . *G06T 5/50* (2013.01); *G06T 5/002* (2013.01); *G06T 2207/10016* (2013.01); *G06T 2207/10104* (2013.01); *G06T 2207/20216* (2013.01); *G06T 2207/30004* (2013.01)

(58) Field of Classification Search
CPC .. G06T 5/50; G06T 5/002; G06T 2207/20216
USPC .................................................. 382/128, 131
See application file for complete search history.

(56) References Cited

U.S. PATENT DOCUMENTS

| 2008/0085041 | A1 | 4/2008 | Breeuwer |
| 2009/0067583 | A1* | 3/2009 | Vogt et al. ...................... 378/207 |
| 2010/0135563 | A1* | 6/2010 | Kelly et al. .................... 382/131 |
| 2010/0290680 | A1* | 11/2010 | Declerck et al. ............... 382/128 |
| 2011/0026797 | A1* | 2/2011 | Declerck et al. ............... 382/131 |
| 2012/0134557 | A1* | 5/2012 | Kelly et al. .................... 382/128 |

\* cited by examiner

*Primary Examiner* — Samir Ahmed
(74) *Attorney, Agent, or Firm* — Schiff Hardin LLP

(57) ABSTRACT

In a method to generate a nuclear medicine image reconstructed from an average of multiple subsets of acquired counts of a dataset, having an image quality characteristic aligned with that of a corresponding image obtained from a reconstruction of all counts of the dataset, a phantom data acquisition is used to determine an appropriate post-processing step necessary to align each image quality characteristic which provides a desired alignment of a given image quality characteristic. The determined post-processing step is applied to the combination of the multiple reconstructions.

6 Claims, 3 Drawing Sheets

FIG 1
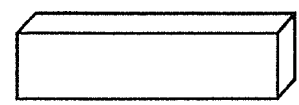
(A) Reconstruction using all acquired counts for bed position
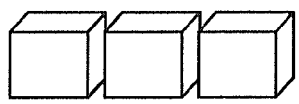
(B) Avarage of 'n' reconstructions of subdivided counts for bed position
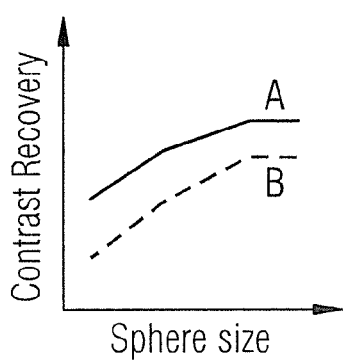
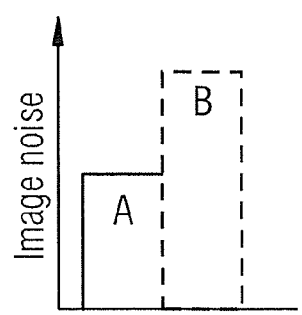

METHOD FOR FRAME AVERAGING POST-FILTER OPTIMIZATION

BACKGROUND OF THE INVENTION

1. Field of the Invention

The present invention concerns a method for aligning an image quality characteristic of a nuclear medicine image of a patient, with the same image quality characteristic of a corresponding nuclear medicine image of the patient.

2. Description of the Prior Art

The following definitions, acronyms, and abbreviations are used herein:

| | |
|---|---|
| NEMA | National Electrical Manufacturers Association |
| PET | Positron Emission Tomography |
| SPECT | Single Photon Emission Computed Tomography |
| SUV | Standardized Uptake Value |
| $^{18}$F-FDG | $^{18}$F-fluorodeoxyglucose, a radiolabelled glucose tracer |

For some applications of PET (or SPECT) imaging, it is desirable to temporally subdivide an acquisition into multiple time frames to create a dynamic sequence. For example, as opposed to computing a single, average uptake value (e.g., SUV) for a given region over a duration of an acquisition, multiple measurements of uptake, such as one per frame, can be used to estimate a rate of change of uptake. This can provide an estimate of whether the rate of uptake is increasing or decreasing with time. Such an estimate of the rate of change of uptake could, for example, aid the discrimination of malignant tissue from inflammation in the case of $^{18}$F-FDG PET.

While the temporally subdivided frames permit useful analysis, a user may typically wish to review an image reconstructed from all counts acquired for a given bed position during the acquisition. This may be achieved by combining the individual reconstructed temporally subdivided frames into a single image, for example by creating an average image, weighted by frame duration. However, since fewer counts are used to reconstruct each individual frame, the count-dependent convergence behavior of the reconstruction algorithm may result in differences in image quality, for example in terms of noise, contrast recovery, between such an averaged image and an image reconstructed from all counts, despite same reconstruction algorithm and settings, for example iterations, subsets, post-filter, being used. These differences in image quality may result in higher (or lower) SUVs being measured for a given region, or different levels of visual noise in the image.

FIG. 1 shows an illustrative example of differences in image quality for an image reconstructed for all counts acquired of a NEMA Image Quality phantom as compared to an image created by averaging multiple reconstructions of the temporally subdivided frames.

Within FIG. 1, drawing (A) schematically represents a process of image reconstruction in which all acquired counts are used in the reconstruction of a single image; drawing (B) schematically illustrates the acquired counts temporally subdivided and reconstructed into a single image. The central plot illustrates a difference in contrast recovery, wherein the image A generated from a single reconstruction of all counts consistently presents improved contrast recovery over a similar image B produced by weighted averaging of the temporally subdivided data. The right-hand plot illustrates the difference in image noise, wherein the image A generated from all plots consistently presents less image noise than a similar image B produced by weighted averaging of the temporally subdivided data.

If the counts to be temporally sub-divided are acquired continuously, it is possible for them to be acquired in listmode format, allowing either a single reconstruction to be made using all counts, or alternatively as a set of reconstructions following rebinning of the data into temporal subdivisions.

If the counts are not acquired continuously, for example as for a multi-bed-position whole-body dynamic scan, this is not typically possible on current systems due to difficulties in decay correction and other limitations.

SUMMARY OF THE INVENTION

The present invention provides an improved method of image reconstruction from temporally sub-divided image data by first identifying an appropriate post-processing step, such as a filtering step, to align user-desired image quality characteristics of the average image with that of a reconstruction using all counts. The invention accordingly allows the user to review the average image with the aligned image quality.

BRIEF DESCRIPTION OF THE DRAWINGS

FIG. 1 shows an illustrative example of differences in image quality for an image reconstructed for all counts acquired of a NEMA Image Quality phantom as compared to an image created by averaging multiple reconstructions of the temporally subdivided frames.

DESCRIPTION OF THE PREFERRED EMBODIMENTS

According to the present invention, image reconstruction from temporally sub-divided image data may be performed by first identifying an appropriate post-processing step, such as a filtering step, to align user-desired image quality characteristics of the average image with that of a reconstruction using all counts. The identified post-processing step is then applied to acquired image data to provide a user with an average image having a similar quality to that of an aligned image.

Figure 2:
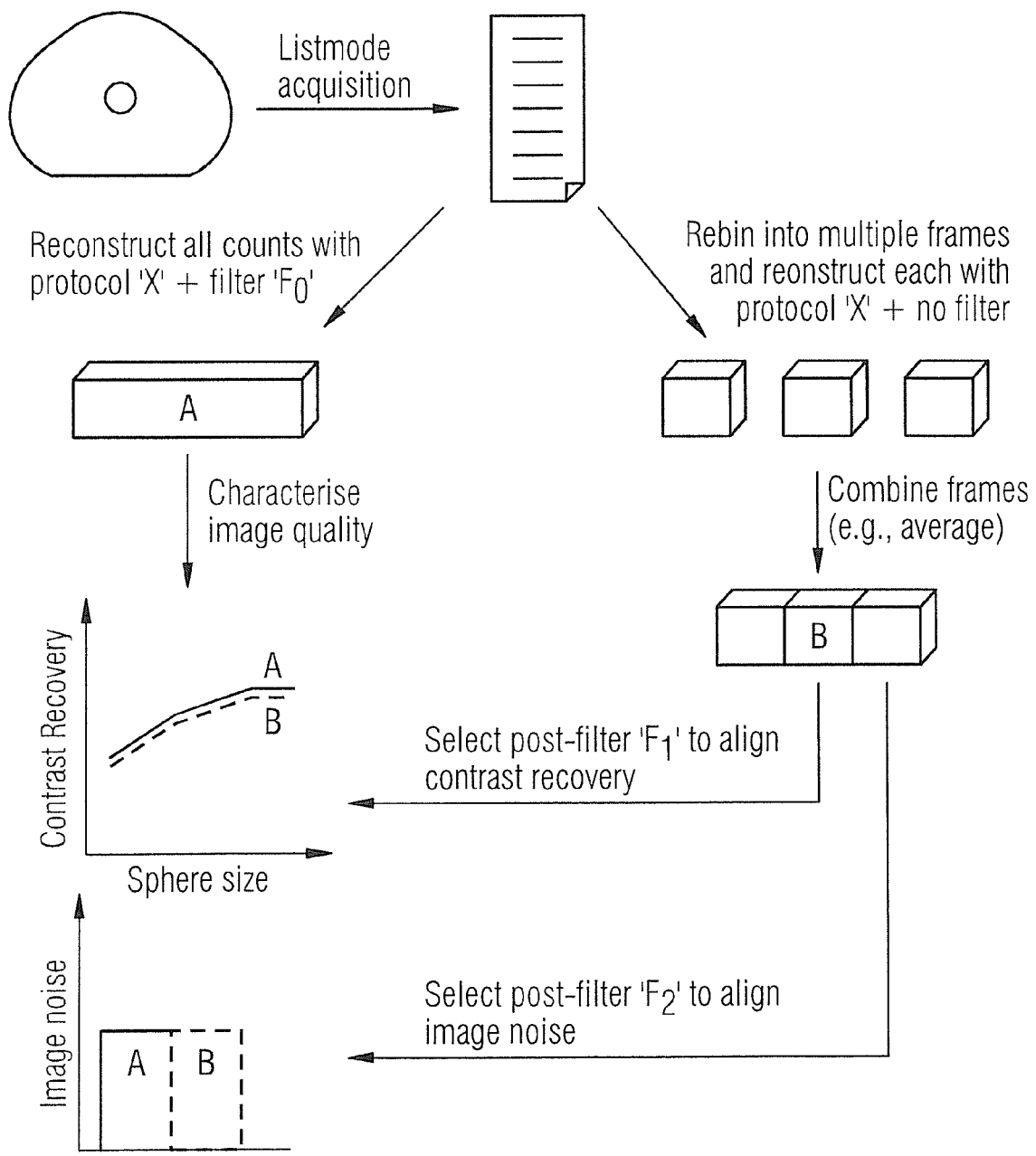
FIG. 2 is a flow diagram of a method according to the present invention showing a filter optimization step.

FIG. 2 schematically represents part of a method according to the present invention, whereby an appropriate post-processing step is identified.

In the first illustrated step, a list mode acquisition of PET or SPECT data is acquired from a subject, such as a NEMA Image Quality Phantom for a selected clinical scan duration.

Next, a reconstruction is performed using a desired reconstruction protocol to form a whole listmode dataset image A. Various parameters need to be defined to form a complete definition of a reconstruction protocol. For example, such parameters may include identification of the algorithm, defining a number of iterations and subsets, and defining a post filter process.

The reconstructed image is analyzed, and associated image quality characteristics such as contrast recovery, image noise are calculated.

The same listmode data is then rebinned into a desired number of frames by temporal subdivision. Each frame is reconstructed with the same reconstruction algorithm as used for the data using the whole listmode dataset, with identical numbers of iterations and subsets, but with an all-pass post filter.

A combined image B is created by averaging individual frames.

A range of post-filter sizes are then applied to the combined image B. Image quality characteristics of the averaged combined image B are calculated for each respective application of a post-filter. A post-filter that provides the closest match for each individual image quality characteristic to that of image A, the reconstruction of all counts, is recorded.

Figure 3:
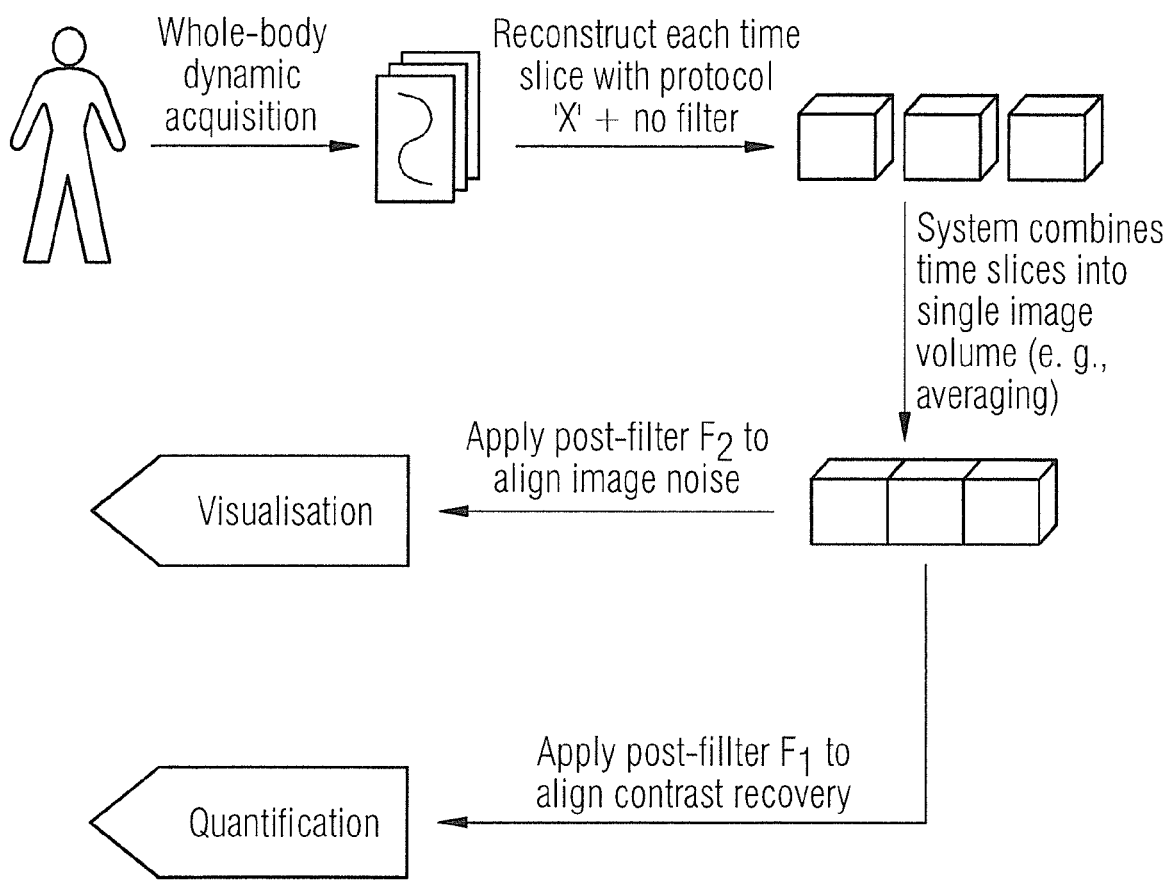
FIG. 3 is a flow diagram of a method according to the present invention showing clinical data acquisition and review steps.

FIG. 3 illustrates a method of clinical data acquisition according to an aspect of the present invention.

In a first step, patient data are acquired using, for example, a whole-body dynamic protocol in which a whole body is imaged in repeated static-scan-style passes, with each pass representing a single time slice and containing multiple bed positions. The acquired data are preferably configured such that each time slice duration is equivalent to the time duration of each of the rebinned frames reconstructed for the NEMA Image Quality phantom as described above.

The whole-body dynamic series is then reconstructed using the same protocol as used for the rebinned frames of the NEMA Image Quality Phantom: same algorithm, number of iterations and subsets, and an all-pass filter.

The whole-body dynamic series, as reconstructed in the previous step, is loaded into a processing system which computes a combined image by averaging the individual time frames.

The processing system then displays the averaged combined image following the application of a post-filter selected to provide the closest available match of a user-preferred image quality characteristic, such as image noise.

An alternative filter may be applied for non-visualized tasks such as quantification, for example, by applying a filter able to align contrast recovery. This functionality is useful as different filters may be required to align different image quality characteristics such as noise and contrast recovery.

The present invention accordingly provides a method to align image quality characteristics of a nuclear medicine image reconstructed from an average of multiple subsets of the acquired counts, with those of the image that would be obtained from a reconstruction of all counts. A phantom acquisition is used to determine the appropriate post-processing step necessary to align each image quality characteristic. A post-processing step is selected, to provide an optimal available alignment of a given image quality characteristic, and is applied to the combination of the multiple reconstructions.

In alternative embodiments of the present invention, different image quality characteristics could be aligned, at the choice of the user, to achieve a desired type of result. For example, different measures of image noise, such as image roughness, background variability; or alternative measures of contrast recovery such as maximum, mean or peak contrast recovery.

In further alternative methods, a user selects a filter size that offers a desired trade-off, in terms of similarity, across a range of image quality characteristics: such as to achieve a best compromise between matching image noise and contrast recovery. As opposed to adjusting the post filter to align image quality characteristics, other reconstruction parameters could be adjusted: such as a number of iterations, or a number of subsets of the phantom data in order to achieve a desired precision (closeness) of the desired alignment.

An alternative phantom may be used to identify the optimal post-processing techniques, or filtering, necessary to align the various image quality parameters.

Alternative acquisition protocols to whole-body dynamic could be used to acquire a set of reconstructions of the subdivided total counts.

Rather than creating and filtering the averaged image in real time, the processing system could reconstruct the various image volumes with appropriate post-filters directly.

Image quality characteristics may be selected and configured for different purposes: such as to align noise for visualization; or to align contrast recovery for quantification.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method to generate a nuclear medicine patient image reconstructed from an average of multiple subsets of acquired counts of a patient dataset, having an image quality characteristic aligned with that of a corresponding nuclear medicine image obtained from a single reconstruction of all counts of the patient dataset, comprising:
   providing a processor with a phantom dataset comprising acquired data acquired from a phantom;
   in said processor, performing an image reconstruction using the whole phantom dataset with a reconstruction algorithm to generate a phantom whole-dataset image;
   in said processor, calculating the image quality characteristic for the phantom whole-dataset image;
   in said processor, temporally dividing the phantom dataset into subsets of phantom image data;
   in said processor, reconstructing each phantom data subset into a data-subset image using the reconstruction algorithm;
   in said processor, generating a combined phantom image by averaging the image data of the phantom data-subset images;
   in said processor, deriving a post-processing filter that, when applied to the combined phantom image, provides a value of the image quality characteristic aligned with that of the whole-dataset image;
   providing said processor with a plurality of sets of time slice data acquired from the patient;
   in said processor, reconstructing a respective time slice image from each of said sets of time slice data using said reconstruction algorithm
   in said processor, generating a combined patient image by averaging said plurality of the slice images; and
   in said processor, applying the derived post-processing filter to the combined patient image, thereby obtaining a post-processed image, and making said post-processed image available at an output of the processor in electronic form.

2. A method according to claim 1 wherein the image quality characteristic is selected from a plurality of available image quality characteristics, to achieve a desired type of result.

3. A method according to claim 2 wherein the image quality characteristic is selected from among a group consisting of image roughness; background variability; maximum, mean or peak contrast recovery.

4. A method according to claim 1, comprising deriving said post-processing filter by selecting a filter size therefor that offers acceptable similarity, across a range of image quality characteristics to achieve a compromise between matching image noise and contrast recovery.

5. A method according to claim 1, comprising, in said processor, determining said appropriate post-processing filter in a plurality of iterations of performing said image reconstruction using said whole phantom dataset, calculating said image quality characteristic, temporally dividing said phantom, reconstructing each phantom data subset, generating said combined phantom image, and deriving said post-processing filter, and selecting a number of said iterations to achieve a selected precision of said desired alignment.

6. A method according to claim 1, comprising selecting a number of said phantom data-subset images to achieve a selected precision of said desired alignment.

* * * * *